No. 783,118. PATENTED FEB. 21, 1905.
L. A. HATCH.
BEET DIGGER OR PLOW SULKY.
APPLICATION FILED APR. 19, 1904.
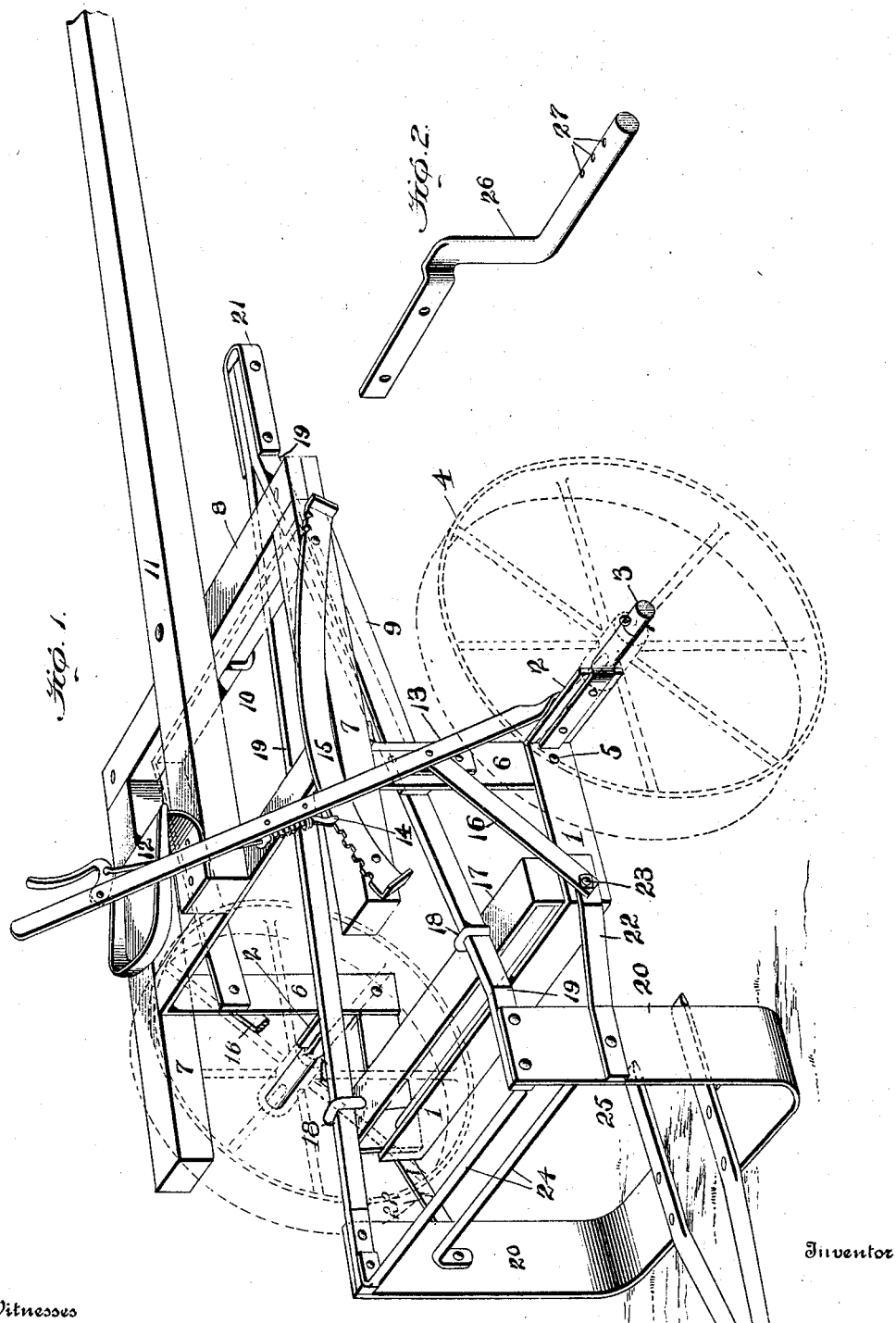
Witnesses
Inventor
Lewis A. Hatch
By Harry N. Copp
his Attorney No. 783,118. Patented February 21, 1905.

UNITED STATES PATENT OFFICE.

LEWIS A. HATCH, OF SALEM, UTAH.

BEET-DIGGER OR PLOW SULKY.

SPECIFICATION forming part of Letters Patent No. 783,118, dated February 21, 1905.

Application filed April 19, 1904. Serial No. 203,945.

*To all whom it may concern:*

Be it known that I, LEWIS A. HATCH, a citizen of the United States of America, and a resident of Salem, Utah county, State of Utah, have invented a certain new and useful Beet-Digger or Plow Sulky, of which the following is a specification.

My invention relates to sulkies, and more especially to that class of sulkies which are adapted to support beet-diggers or cultivator-plows; and the object of the invention is the provision of means whereby the beet-diggers can be exchanged on the sulky and cultivator-plows attached thereto.

A further object of the invention is the provision of means whereby the depth of the digger-blades is regulated, and a still further object of the invention is the provision of means whereby this function is performed in a different manner.

In the drawings, Figure 1 is a perspective view, and Fig. 2 is a detailed perspective, of a modified stub-axle.

Referring more specially to the drawings, 1 represents a U-shaped frame which has the legs thereof bent outward at 2, and to this portion 2 are secured the stub-axles 3, on which are mounted any suitable wheels 4. Pivoted to the frame 1 by means of a bolt 5 is a similar U-shaped frame 6, which extends upward at right angles to the frame 1 and has secured thereto the bars 7, one on each side thereof. These bars are connected by a bar 8, which is supported by braces 9, extending up from the frame 6 and engaging the bar 8 on its under side and being held in that position by clip 10. This bar 8 is connected to the tongue 11 and forms a foot-rest. The tongue 11 is secured to the bar 8 and to the frame 6, and positioned at the rear end thereof is the driver's seat 12. Rigidly secured to the portion 2 of the frame 1 is a lever 13, which is provided with the spring-pressed pawl 14, adapted to engage the teeth of a rack-bar 15.

Secured to the right-hand leg 7 in any suitable manner and extending rearwardly from the lever 13 is a brace 16, which is connected to the frame 1 at the rear end thereof. This brace is immaterial to the construction and only tends to strengthen the action of the lever.

Removably secured to the frame 1 is a short U-shaped frame 17, provided at 18 with clips which are adapted to secure to said frame the shafts 19 of the beet-digger frame 20. These shafts extend forward and meet at a point near the forward end of the machine, where they are secured together by clip 21, to which is attached the usual whiffletree. The beet-digger frame is braced with relation to the frame 1 by means of a bar 22, which is removably held in place by the bolt 23. The frame 20 is provided with transverse braces 24 and with the usual digger-blades 25.

In Fig. 2 I have shown a modified construction of the stub-axle 26, which is provided with several apertures 27, whereby the wheel may be adjusted so as to regulate the width of tread. This axle is intended to replace the one shown in Fig. 1, so as to enable the right wheel to be raised or lowered with the lever 13.

The operation of the device is as follows: When it is desired to raise the digger-frame 20 and the blades 25, the lever 13 is pushed forward and the frame 1 is raised, carrying with it the shafts 19 and the frame 20. The notches shown at the forward end of the rack-bar 15 enable the operator to throw the blades entirely out of the ground, as when traveling from one point to another, when it is not desired to cultivate the ground or dig beets.

Having thus described my invention, what I claim as new, and desire to secure by Letters Patent, is—

1. In a device of the class described, the combination with supporting-wheels, stub-axles for said wheels and a horizontal frame connected to said stub-axles, of a vertical frame pivoted to said horizontal frame and supporting a pole, digger-blades removably connected to said horizontal frame, a lever connected to said horizontal frame whereby said frame is raised and lowered, and a rack-bar secured to the vertical frame for holding the lever in any predetermined position.

2. In a device of the class described, the combination with supporting-wheels, stub-axles in said wheels and a horizontal frame connected to said stub-axles, of a vertical frame pivoted to said horizontal frame, a U-shaped frame secured to the horizontal frame, a beet-digger frame removably connected to said U-shaped frame, means for raising and lowering said frame, and means connected to said upright frame whereby the raising and lowering means may be locked in any predetermined position.

3. In a device of the class described, the combination with supporting-wheels, stub-axles in said wheels and a horizontal frame connected to said stub-axles, of a vertical frame pivoted to said horizontal frame, a U-shaped frame secured to the horizontal frame, a beet-digger frame removably connected to said U-shaped frame, a lever connected to said horizontal frame for raising and lowering said beet-digger frame, and a rack-bar secured to the vertical frame whereby the lever is held in any predetermined position.

In witness whereof I have hereunto set my hand in the presence of two witnesses.

LEWIS A. HATCH.

Witnesses:
MARVIN SNOW,
HARVEY CLUFF.